United States Patent
Wu

(10) Patent No.: US 10,342,051 B2
(45) Date of Patent: Jul. 2, 2019

(54) DEVICE AND METHOD OF HANDLING LONG TERM EVOLUTION-WIRELESS LOCAL AREA NETWORK AGGREGATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 144 days.

(21) Appl. No.: 15/176,175

(22) Filed: Jun. 8, 2016

(65) Prior Publication Data

US 2016/0366709 A1  Dec. 15, 2016

Related U.S. Application Data

(60) Provisional application No. 62/173,378, filed on Jun. 10, 2015, provisional application No. 62/173,382, filed on Jun. 10, 2015.

(51) Int. Cl.
*H04L 5/00* (2006.01)
*H04W 76/10* (2018.01)
(Continued)

(52) U.S. Cl.
CPC ............. *H04W 76/10* (2018.02); *H04L 5/001* (2013.01); *H04L 5/0091* (2013.01);
(Continued)

(58) Field of Classification Search
None
See application file for complete search history.

(56) References Cited

U.S. PATENT DOCUMENTS

| 2013/0083661 A1 | 4/2013 | Gupta |
| 2013/0242897 A1 | 9/2013 | Meylan |

(Continued)

FOREIGN PATENT DOCUMENTS

| CN | 104170308 A | 11/2014 |
| WO | 2014/157898 A1 | 10/2014 |

OTHER PUBLICATIONS

3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
(Continued)

*Primary Examiner* — Jutai Kao
(74) *Attorney, Agent, or Firm* — Winston Hsu

(57) ABSTRACT

A communication device of enabling long term evolution (LTE)-Wireless Local Area Network (WLAN) aggregation comprises instructions of transmitting a first message indicating support of LTE-WLAN aggregation, to the BS via LTE communication, when a WLAN function of the communication device is not enabled; receiving a first configuration message configuring the LTE-WLAN aggregation from the BS via the LTE communication; receiving at least one first LTE packet from the BS via a WLAN configured by a WLAN configuration in the first configuration message; and transmitting a notification message indicating that a connection to the WLAN is lost or requesting the BS to release the WLAN configuration to the BS via the LTE communication, when the WLAN function of the communication device is enabled by an operating system of the communication device.

20 Claims, 9 Drawing Sheets

(51) Int. Cl.
  *H04W 76/16* (2018.01)
  *H04W 76/30* (2018.01)
  *H04W 84/12* (2009.01)

(52) U.S. Cl.
  CPC ............ *H04W 76/16* (2018.02); *H04W 76/30* (2018.02); *H04W 84/12* (2013.01)

(56) References Cited

U.S. PATENT DOCUMENTS

| | | | |
|---|---|---|---|
| 2014/0022918 A1 | 1/2014 | Guo | |
| 2014/0092828 A1 | 4/2014 | Sirotkin | |
| 2015/0146617 A1 | 5/2015 | Park | |
| 2015/0208286 A1* | 7/2015 | Ozturk | H04W 36/0022 370/331 |
| 2016/0050605 A1* | 2/2016 | Kim | H04W 28/08 370/331 |
| 2016/0278138 A1* | 9/2016 | Chen | H04W 76/021 |
| 2016/0338074 A1* | 11/2016 | Chou | H04W 76/046 |
| 2017/0215122 A1* | 7/2017 | Nigam | H04W 40/02 |

OTHER PUBLICATIONS

3GPP TS 36.321 V12.5.0 (Mar. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).
3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TS 36.323 V12.3.0 (Mar. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).
Search Report dated Oct. 31, 2016 for EP application No. 16173680.6, pp. 1~9.
Samsung, "Considerations of user preference on LTE-WLAN interworking / aggregation", 3GPP TSG-RAN WG2 Meeting #89bis, R2-152339, May 25-29, 2015, Fukuoka, Japan, XP050971335, pp. 1-5.
InterDigital Communications, "Quality-of-Service (QoS) with LTE+WLAN Aggregation in LTE R13", 3GPP TSG-RAN WG2 #90, Tdoc R2-152564(update to R2-151559), May 25-29, 2015, Fukuoka, Japan, XP050971560, pp. 1-4.
InterDigital Communications, "Bearer Architecture for LTE+WLAN Aggregation in LTE R13", 3GPP TSG-RAN WG2 #90, Tdoc R2-152566(update to R2-151560), May 25-29, 2015, Fukuoka, Japan, XP050971563, pp. 1-3.
Office action dated Oct. 30, 2017 for the Taiwan application No. 105118296, filing date Jun. 13, 2016, p. 1-14.
Office action dated Jun. 11, 2018 for the Taiwan application No. 105118296, filing date Jun. 13, 2016, p. 1~18.
Office action dated Mar. 22, 2019 for the China application No. 201610410135.4, filed Jun. 12, 2016, pp. 1-10.
Discussion on Architectural and Procedure of C-plane for LTE-WLAN Aggregation, CATT, 3GPP TSG RAN WG2 Meeting #90, R2-152125, Fukuoka, Japan, May 25-29, 2015.

* cited by examiner

DEVICE AND METHOD OF HANDLING LONG TERM EVOLUTION-WIRELESS LOCAL AREA NETWORK AGGREGATION

CROSS REFERENCE TO RELATED APPLICATIONS

This application claims the benefit of U.S. Provisional Applications No. 62/173,378 and No. 62/173,382, filed on Jun. 10, 2015, which are incorporated herein by reference.

BACKGROUND OF THE INVENTION

1. Field of the Invention

The present invention relates to a communication device and a method used in a wireless communication system, and more particularly, to a communication device and method of handling long term evolution-wireless local area network aggregation in a wireless communication system.

2. Description of the Prior Art

Long term evolution (LTE)-wireless local area network (WLAN) aggregation is used for increasing data rate. However, it is unknown whether/how to perform the LTE-WLAN aggregation, when a WLAN function of a user equipment (UE) is enabled/disabled via a user interface.

Thus, whether/how to perform the LTE-WLAN aggregation is an important problem to be solved.

SUMMARY OF THE INVENTION

The present invention therefore provides a method and related communication device for handling the LTE-WLAN aggregation to solve the abovementioned problem.

A communication device of enabling long term evolution (LTE)-Wireless Local Area Network (WLAN) aggregation comprises a storage unit for storing instructions and a processing means coupled to the storage unit. The processing means is configured to execute the instructions stored in the storage unit. The instructions comprise transmitting a first message indicating support of LTE-WLAN aggregation, to the BS via LTE communication, when a WLAN function of the communication device is not enabled; receiving a first configuration message configuring the LTE-WLAN aggregation from the BS via the LTE communication; receiving at least one first LTE packet from the BS via a WLAN configured by a WLAN configuration in the first configuration message; and transmitting a notification message indicating that a connection to the WLAN is lost or requesting the BS to release the WLAN configuration to the BS via the LTE communication, when the WLAN function of the communication device is enabled by an operating system of the communication device.

A communication device of enabling long term evolution (LTE)-Wireless Local Area Network (WLAN) aggregation comprises a storage unit for storing instructions and a processing means coupled to the storage unit. The processing means is configured to execute the instructions stored in the storage unit. The instructions comprise transmitting a first message indicating support of LTE-WLAN aggregation to the BS via LTE communication, when a WLAN function of the communication device is enabled by an operating system of the communication device; and not transmitting the first message indicating the support of the LTE-WLAN aggregation to the BS, when the WLAN function of the communication device is disabled by the operating system.

A communication device of enabling long term evolution (LTE)-Wireless Local Area Network (WLAN) aggregation comprises a storage unit for storing instructions and a processing means coupled to the storage unit. The processing means is configured to execute the instructions stored in the storage unit. The instructions comprise transmitting a first message indicating support of LTE-WLAN aggregation to the BS via LTE communication, when a WLAN function of the communication device is enabled by an operating system of the communication device; receiving a first configuration message configuring the LTE-WLAN aggregation from the BS via the LTE communication; receiving at least one first LTE packet from the BS via a WLAN configured by a WLAN configuration in the first configuration message; and transmitting a notification message indicating that a connection to the WLAN is lost or requesting the BS to release the WLAN configuration to the BS via the LTE communication, when the WLAN function of the communication device is disabled by the operating system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
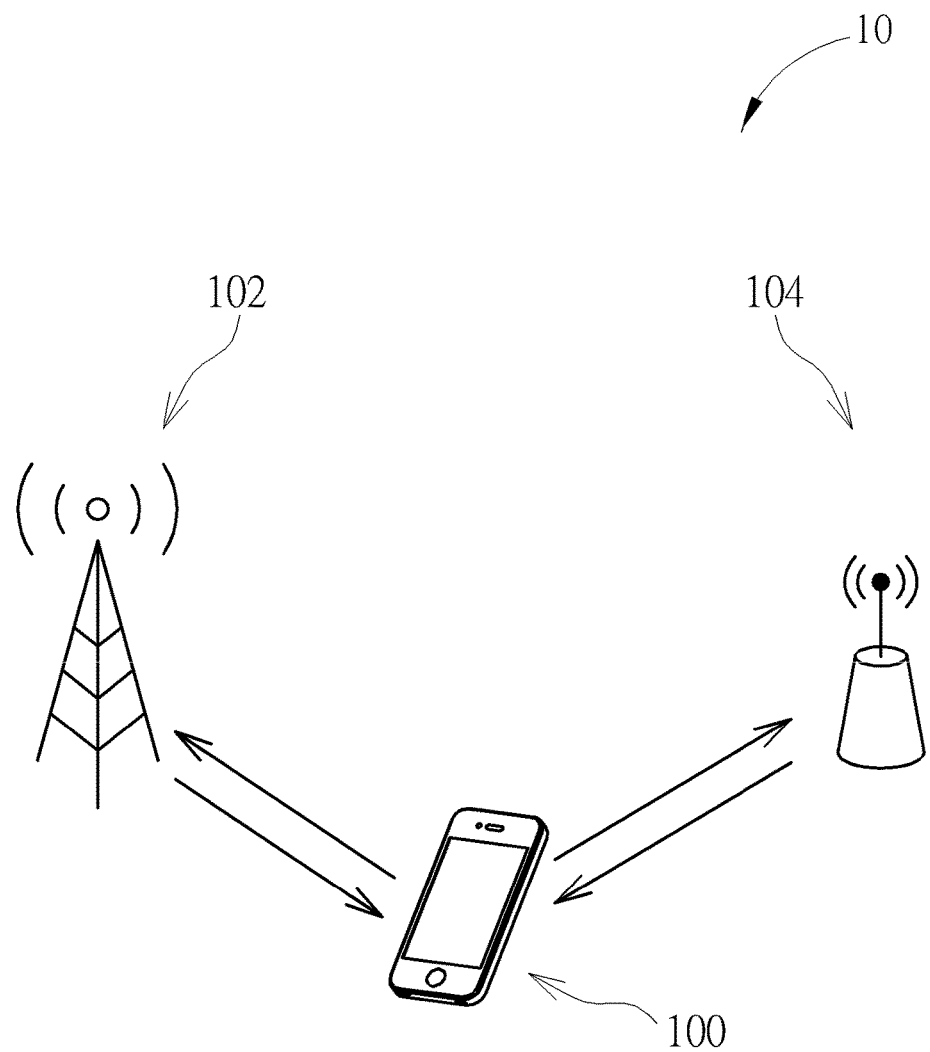
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and an access point (AP) 104. In FIG. 1, the communication device 100, the BS 102 and AP 104 are simply utilized for illustrating the structure of the wireless communication system 10. In one example, the BS 102 may be an evolved Node-B (eNB) in an evolved universal terrestrial radio access network (E-UTRAN) of a long term evolution (LTE) system, or a fifth generation (5G) BS employing orthogonal frequency-division multiplexing (OFDM) and/or non-OFDM for communicating with the communication device 100 in a wider bandwidth (e.g., greater than 20 MHz) or a shorter time interval (e.g., less than 1 ms) of transmission. The AP 104 may be a network entity in a wireless local area network (WLAN). The communication device 100 and the AP 104 may support IEEE 802.11 related standards (e.g., IEEE 802.11a/b/g/n/ac/ad).

In FIG. 1, the communication device 100 may be configured to communicate with the BS 102 and the AP 104 at the same time according to LTE-WLAN aggregation or 5G-WLAN aggregation configured to the communication device 100. That is, the communication device 100 performs a transmission/reception to/from the BS 102 and the AP 104 via the LTE/5G and the WLAN. In addition, the communication device 100 communicates with the BS 102 via one or more radio bearer(s) utilizing the LTE, 5G resource(s) and/or the WLAN resource(s).

The communication device 100 may be a user equipment (UE), a mobile phone, a laptop, a tablet computer, an electronic book, a portable computer system, a vehicle or an aircraft. In addition, for an uplink (UL), the communication device 100 is a transmitter and the BS 102 and AP 104 are receivers, and for a downlink (DL), the BS 102 and AP 104 are transmitters and the communication device 100 is a receiver.

Figure 2:
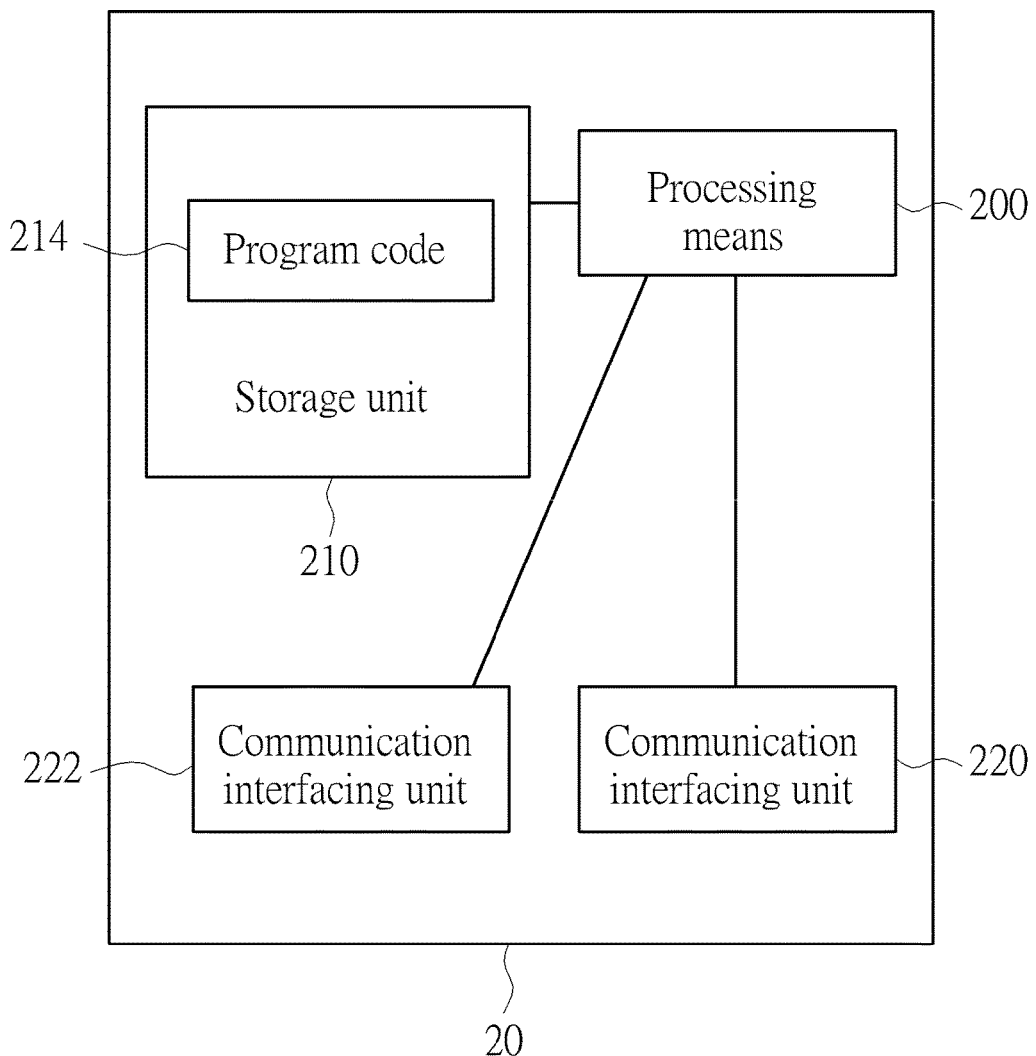
FIG. 2 is a schematic diagram of a communication device according to an example of the present invention.

FIG. 2 is a schematic diagram of a communication device 20 according to an example of the present invention. The communication device 20 may be the communication device 100, the BS 102 or the AP 104 shown in FIG. 1, but is not limited herein. The communication device 20 includes a processing means 200 such as a microprocessor or Application Specific Integrated Circuit (ASIC), a storage unit 210, a communication interfacing unit 220 for LTE/5G transmission/reception, and a communication interfacing unit 222 for WLAN (e.g., WiFi) transmission/reception. The storage unit 210 may be any data storage device that may store a program code 214, accessed and executed by the processing means 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
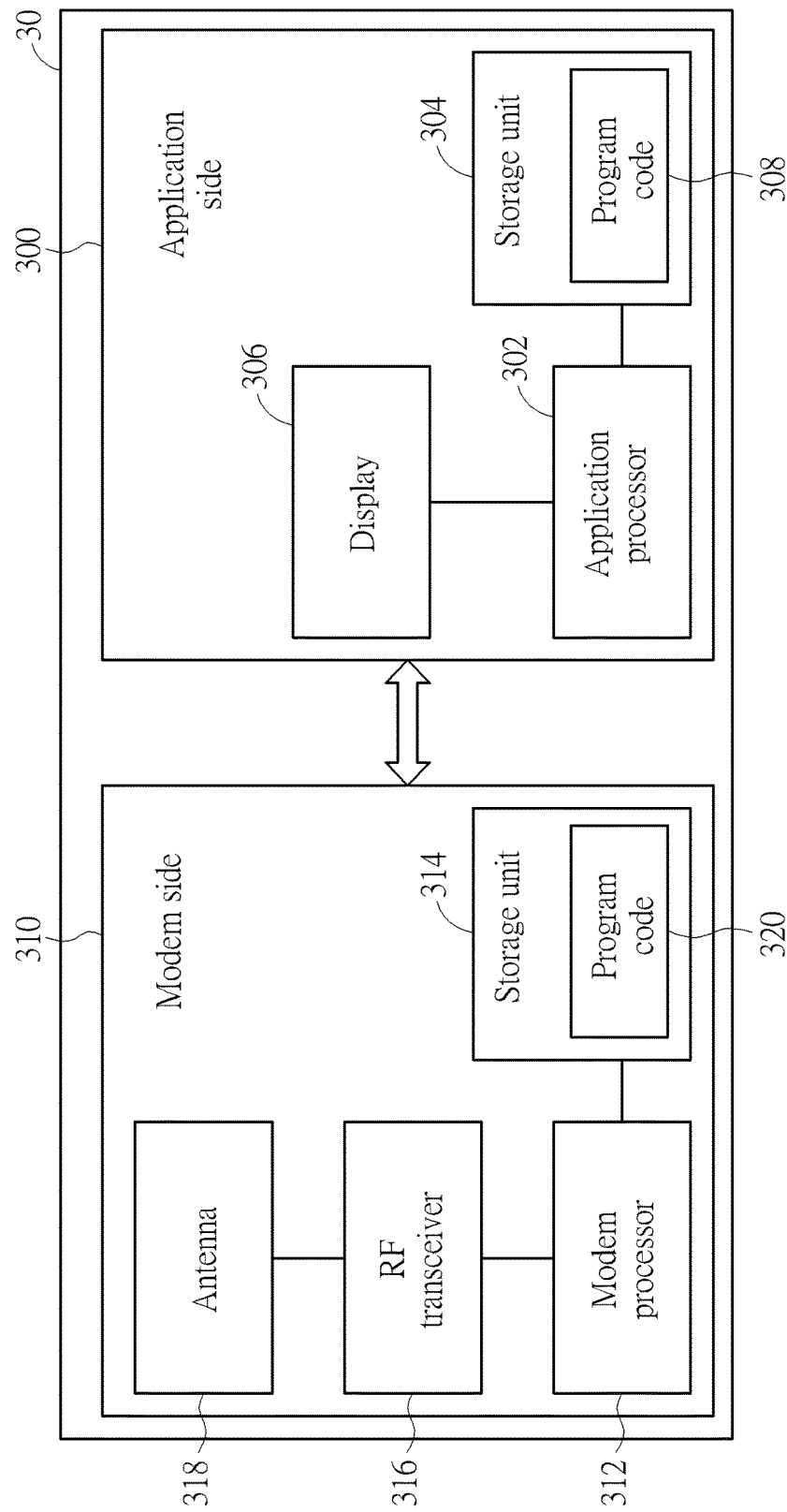
FIG. 3 is a schematic diagram of a communication device according to an example of the present invention.

FIG. 3 is a schematic diagram of a communication device 30 according to an embodiment of the present invention. The communication device 30 may be the communication device 100, the BS 102 or the AP 104 shown in FIG. 1, but is not limited herein. The communication device 30 may include an application side (APS) 300 (e.g., application module) and a modem side (MDS) 310 (e.g., modem module), which may communicate with each other. The APS 300 includes an application processor 302, an application storage unit 304, and a display 306. The MDS 310 includes a modem processor 312, a modem storage unit 314, a radio frequency (RF) transceiver 316, and an antenna 318. The application processor 302 may run an operating system (OS) (e.g., an Android OS, a Windows phone 7 OS, or an iPhone OS (iOS)) to control the display 306 to display software applications and a user interface (UI). The modem processor 312 may run communication protocols to support wireless communication technologies of LTE/5G/WLAN. The application storage unit 304 and the modem storage unit 314 may be any data storage device that stores program codes 308 and 320, accessed and executed by the application processor 302 and the modem processor 312, respectively. Examples of the application storage unit 304 and the modem storage unit 314 include but are not limited to a ROM, flash memory, RAM, hard disk, optical data storage device, non-volatile storage unit, non-transitory computer-readable medium (e.g., tangible media), cloud storage, etc. The application storage unit 304 and the modem storage unit 314 may share a same data storage device, e.g., the same data storage device may have two partitions. The RF transceiver 316 may be used for communicating with other communication devices wirelessly and may transform processing results from the modem processor 312 into radio signals. Examples of the display 306 are realized but are not limited to a liquid crystal display (LCD), an e-paper display, a touch control display, or any other suitable display device.

In the following embodiments, a UE is used for representing the communication device 100 in FIG. 1 and a BS is used for representing the BS 102 and/or AP 104 in FIG. 1 to simplify the illustration of the examples. The "LTE" is used to describe the invention to simplify the illustration of the examples. The "LTE" should not be a restriction to the invention and may be replaced by "5G".

Figure 4:
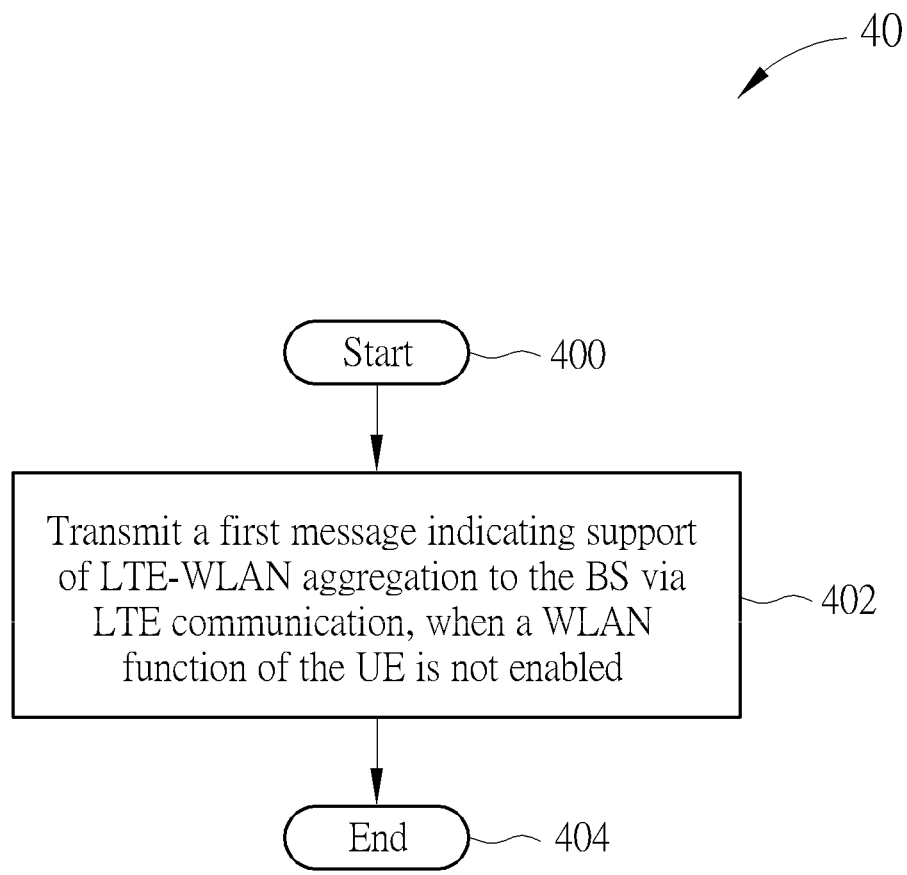
FIG. 4 is a flowchart of a process according to an example of the present invention.

FIG. 4 is a flowchart of a process 40 according to an example of the present invention. The process 40 may be utilized in a UE, to perform LTE-WLAN aggregation. The process 40 includes the following steps:

Step 400: Start.

Step 402: Transmit a first message indicating support of LTE-WLAN aggregation to the BS via LTE communication, when a WLAN function of the UE is not enabled.

Step 404: End.

According to the process 40, the UE transmits a first message indicating support of LTE-WLAN aggregation to the BS (e.g., eNB) via LTE communication, when a WLAN (e.g., WiFi) function of the UE is not enabled e.g. by an operating system (OS) of the UE or via a user interface (UI) of the UE.

Realization of the process 40 is not limited to the above description.

In one example, the UE transmits a second message indicating that the LTE-WLAN aggregation is not supported to the BS via the LTE communication, when a user enables the WLAN function of the UE via the UI. The user may prefer that the UE selects a WLAN preferred or selected by the user. Thus, the BS does not configure the UE to connect to a WLAN different from the WLAN selected by the user.

In one example, the UE transmits a second message indicating that the LTE-WLAN aggregation is not supported to the BS via the LTE communication, when the WLAN function of the UE is enabled by an OS of the UE and the UE connects to a WLAN selected by the OS.

In one example, the UE receives a first configuration message (e.g., RRCConnectionReconfiguration) configuring the LTE-WLAN aggregation from the BS via the LTE communication after transmitting the first message. The UE receives the at least one LTE packet from the BS via the WLAN in response to the configuration message. In one example, the BS transmits the first configuration message, because the BS knows that the UE supports the LTE-WLAN aggregation according to the first message. In another example, the BS transmits the first configuration message after receiving a measurement result indicating signal strength or quality of the WLAN is good.

Figure 5:
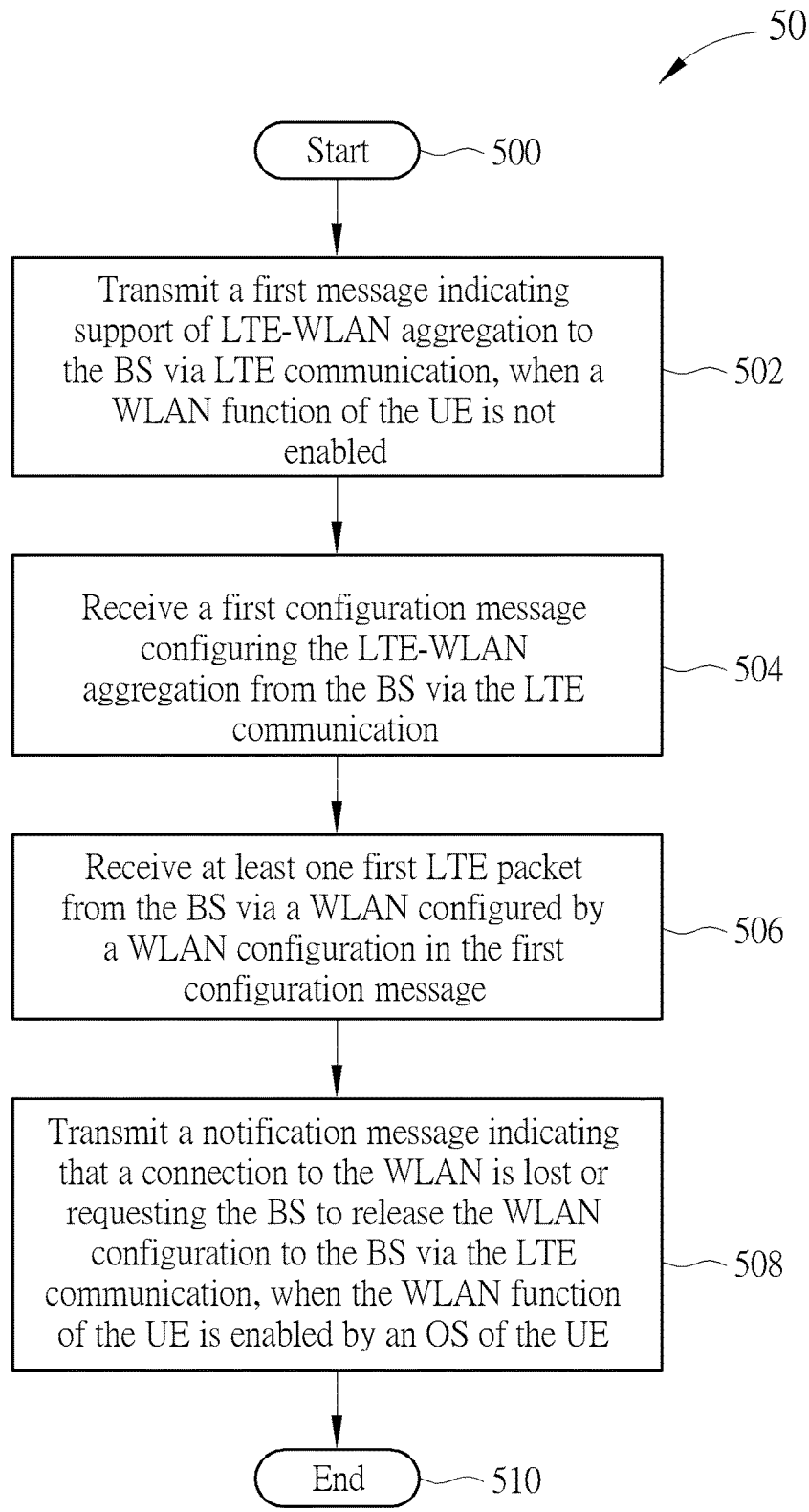
FIG. 5 is a flowchart of a process according to an example of the present invention.

FIG. 5 is a flowchart of a process 50 according to an example of the present invention. The process 50 may be utilized in a UE, to perform LTE-WLAN aggregation. The process 50 includes the following steps:

Step 500: Start.

Step 502: Transmit a first message indicating support of LTE-WLAN aggregation to the BS via LTE communication, when a WLAN function of the UE is not enabled.

Step 504: Receive a first configuration message configuring the LTE-WLAN aggregation from the BS via the LTE communication.

Step 506: Receive at least one first LTE packet from the BS via a WLAN configured by a WLAN configuration in the first configuration message.

Step 508: Transmit a notification message indicating that a connection to the WLAN is lost or requesting the BS to release the WLAN configuration to the BS via the LTE communication, when the WLAN function of the UE is enabled by an OS of the UE.

Step 510: End.

According to the process 50, the UE transmits a first message indicating support of LTE-WLAN aggregation to the BS (e.g., eNB) via LTE communication, when a WLAN (e.g., WiFi) function of the UE is not enabled. The UE receives a first configuration message (e.g., RRCConnectionReconfiguration) configuring the reception of the at least one LTE packet via the WLAN and a WLAN configuration from the BS via the LTE communication. Then, the UE receives at least one first LTE packet from the BS via the WLAN configured by the WLAN configuration. Further, the UE transmits a notification message indicating that a connection to the WLAN is lost or requesting the BS to release the WLAN configuration to the BS via the LTE communication, when the WLAN function of the UE is enabled by an OS.

Realization of the processes 40 and 50 are not limited to the above description.

In one example, the WLAN configuration includes a service set identifier (SSID), a basic service set identifier (BSSID) and/or a homogenous extended service set identifier (HESSID), such that the UE selects and connects to the WLAN identified by the at least one of the IDs.

In one example, the BS stops transmitting the at least one first LTE packet via the WLAN, when the BS receives the notification message. Further, the BS may or may not transmit a second configuration message (e.g., RRCConnectionReconfiguration) releasing the WLAN configuration or reconfiguring a DRB to which the at least one first LTE packet belong, to the UE. When the UE receives the second configuration, the UE releases the LTE-WLAN aggregation. The UE transmits at least one third LTE packet of the DRB via the LTE communication instead of the WLAN after releasing the LTE-WLAN aggregation.

In one example, when the UE is configured the LTE-WLAN aggregation, the UE receives at least one second LTE packet from the BS via the LTE communication, wherein the at least one first LTE packet and the at least one second LTE packet belong to a same data radio bearer (DRB) or a same PDCP entity.

In one example, the UE scans a plurality of WLAN channels to find another WLAN with a SSID preferred or prioritized by the OS higher than the WLAN configured by the first configuration message, when the WLAN function of the UE is enabled by the OS. In another example, the UE connects to another WLAN with a SSID preferred by a user or prioritized by the OS higher than the WLAN configured by the configuration message, when the WLAN function of the UE is enabled by the OS. Thus, the UE stops receiving the at least one first LTE packet from the BS via the WLAN configured by the WLAN configuration, when the UE connects to the WLAN selected by the OS.

In one example, the UE transmits a status report indicating which LTE packet is received or not to the BS via the LTE communication, when the WLAN function of the UE is enabled by the OS or in response to the first or second configuration message.

In one example, the UE enables the WLAN function of the UE, when the UE receives the WLAN configuration or a WLAN measurement configuration. The WLAN measurement configuration is to configure the UE to perform WLAN measurements.

In one example, the UE receives a status report indicating which LTE packet is received or not by the BS, wherein the status report is transmitted from the BS via the LTE communication in response to the notification message.

Figure 6:
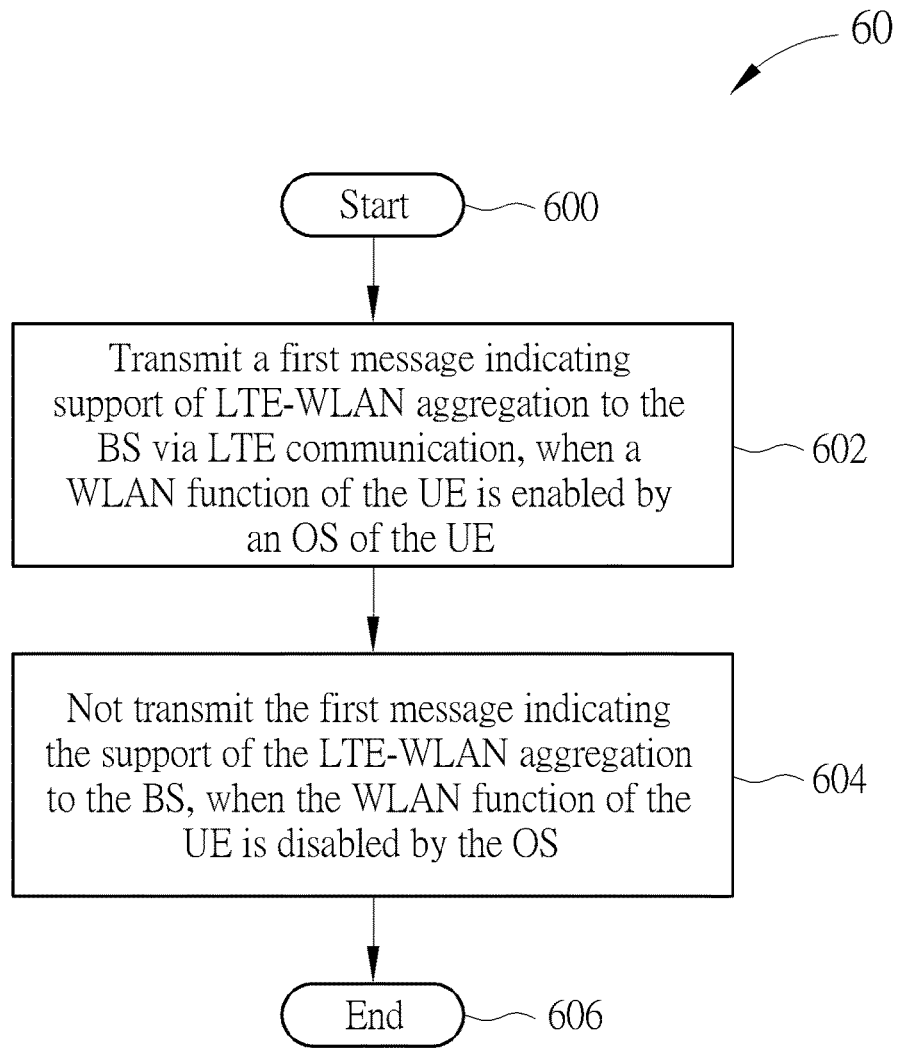
FIG. 6 is a flowchart of a process according to an example of the present invention.

FIG. 6 is a flowchart of a process 60 according to an example of the present invention. The process 60 may be utilized in a UE, to perform LTE-WLAN aggregation. The process 60 includes the following steps:

Step 600: Start.

Step 602: Transmit a first message indicating support of LTE-WLAN aggregation to the BS via LTE communication, when a WLAN function of the UE is enabled by an OS of the UE.

Step 604: Not transmit the first message indicating the support of the LTE-WLAN aggregation to the BS, when the WLAN function of the UE is disabled by the OS.

Step 606: End.

According to the process 60, the UE transmits a first message indicating support of LTE-WLAN aggregation to the BS (e.g., eNB) via LTE communication, when a WLAN (e.g., WiFi) function of the UE is enabled by an OS of the UE. The UE does not transmit the first message indicating the support of the LTE-WLAN aggregation to the BS, when the WLAN function of the UE is disabled by the OS. Note, the LTE-WLAN aggregation may not work, when the UE is configured with the LTE-WLAN aggregation and the WLAN function is disabled by the OS. The process 60 prevents the UE from being configured with the LTE-WLAN aggregation by the BS, when a user disables the WLAN function.

Realization of the process 60 is not limited to the above description.

In one example, the UE transmits the first message indicating the support of the LTE-WLAN aggregation to the BS via LTE communication. In one example, the UE transmits a second message indicating that the LTE-WLAN aggregation is not supported to the BS via the LTE communication, when the WLAN function of the UE is disabled by the OS.

In one example, the UE receives a first configuration message (e.g., RRCConnectionReconfiguration) configuring the LTE-WLAN aggregation from the BS via the LTE communication, after transmitting the first message. Further, the UE connects to the WLAN according to a WLAN configuration in the first configuration message, and receives at least one LTE packet from the BS via the WLAN in response to the first configuration message.

In one example, the BS transmits the first configuration message, because the BS knows that the UE supports the LTE-WLAN aggregation according to the first message. In one example, the BS transmits the first configuration message, because the BS receives a measurement result indicating that signal strength or quality of the WLAN is good after receiving the first message.

In one example, the UE transmits the first message indicating the support of the LTE-WLAN aggregation to the BS, when the WLAN function of the UE is enabled and the UE does not connect to a WLAN selected by the user.

Figure 7:
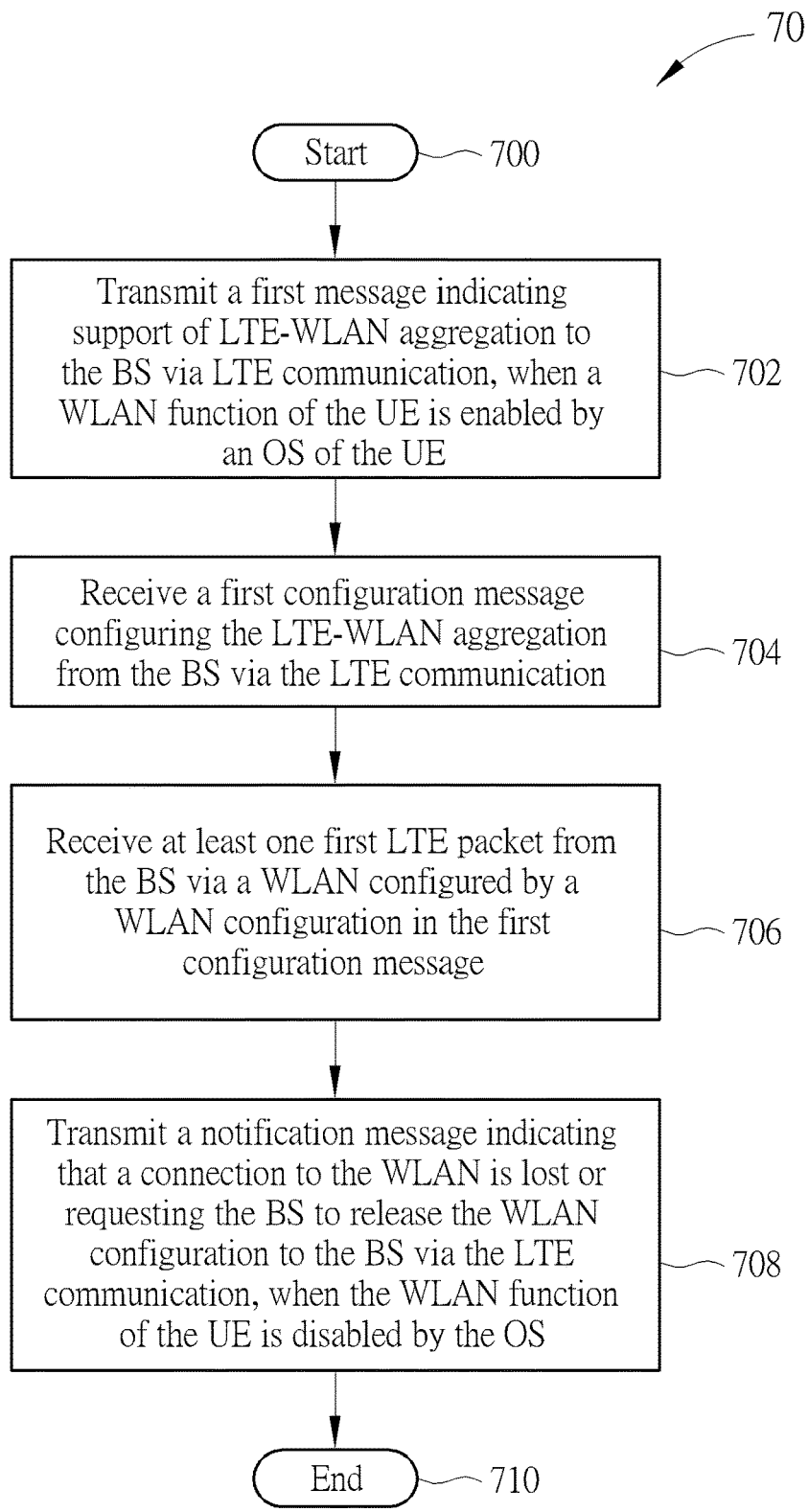
FIG. 7 is a flowchart of a process according to an example of the present invention.

FIG. 7 is a flowchart of a process 70 according to an example of the present invention. The process 70 may be utilized in a UE, to perform LTE-WLAN aggregation. The process 70 includes the following steps:

Step 700: Start.

Step 702: Transmit a first message indicating support of LTE-WLAN aggregation to the BS via LTE communication, when a WLAN function of the UE is enabled by an OS of the UE.

Step 704: Receive a first configuration message configuring the LTE-WLAN aggregation from the BS via the LTE communication.

Step 706: Receive at least one first LTE packet from the BS via a WLAN configured by a WLAN configuration in the first configuration message.

Step 708: Transmit a notification message indicating that a connection to the WLAN is lost or requesting the BS to release the WLAN configuration to the BS via the LTE communication, when the WLAN function of the UE is disabled by the OS.

Step 710: End.

According to the process 70, the UE transmits a first message indicating support of LTE-WLAN aggregation to the BS (e.g., eNB) via LTE communication, when a WLAN (e.g., WiFi) function of the UE is enabled by an OS. The UE receives a first configuration message (e.g., RRCConnectionReconfiguration) configuring the LTE-WLAN aggregation from the BS via the LTE. Then, the UE receives at least one first LTE packet from the BS via a WLAN configured by a WLAN configuration in the first configuration message. Further, the UE transmits a notification message indicating that a connection to the WLAN is lost or requesting the BS to release the WLAN configuration to the BS via the LTE communication, when the WLAN function of the UE is disabled by the OS.

Realization of the process 70 is not limited to the above description.

In one example, the WLAN configuration includes a SSID, a BSSID and/or a HESSID, such that the UE selects and connects to the WLAN identified by the at least one of the IDs.

In one example, the BS stops transmitting the at least one first LTE packet via the WLAN, when the BS receives the notification message. Further, the BS may or may not transmit a second configuration message (e.g., RRCConnectionReconfiguration) releasing the WLAN configuration or reconfiguring a DRB to which the at least one first LTE packet belong, to the UE, or releasing the WLAN configuration of the UE in a storage of the BS. When the UE receives the second configuration, the UE releases the LTE-WLAN aggregation. The UE transmits at least one third LTE packet of the DRB via the LTE communication instead of the WLAN after releasing the LTE-WLAN aggregation.

In one example, the UE receives at least one second LTE packet from the BS via the LTE communication, wherein the at least one first LTE packet and the at least one second LTE packet belong to a same data radio bearer (DRB) or a same PDCP entity.

In one example, the UE stops receiving the at least one first LTE packet from the BS via the WLAN configured by the WLAN configuration, when the WLAN function of the UE is disabled In one example, the UE transmits a status report indicating which LTE packet is received or not to the BS via the LTE communication, when the WLAN function of the UE is disabled.

In one example, the UE receives a status report indicating which LTE packet is received or not by the BS, wherein the status report is transmitted from the BS via the LTE communication in response to the notification message.

Figure 8:
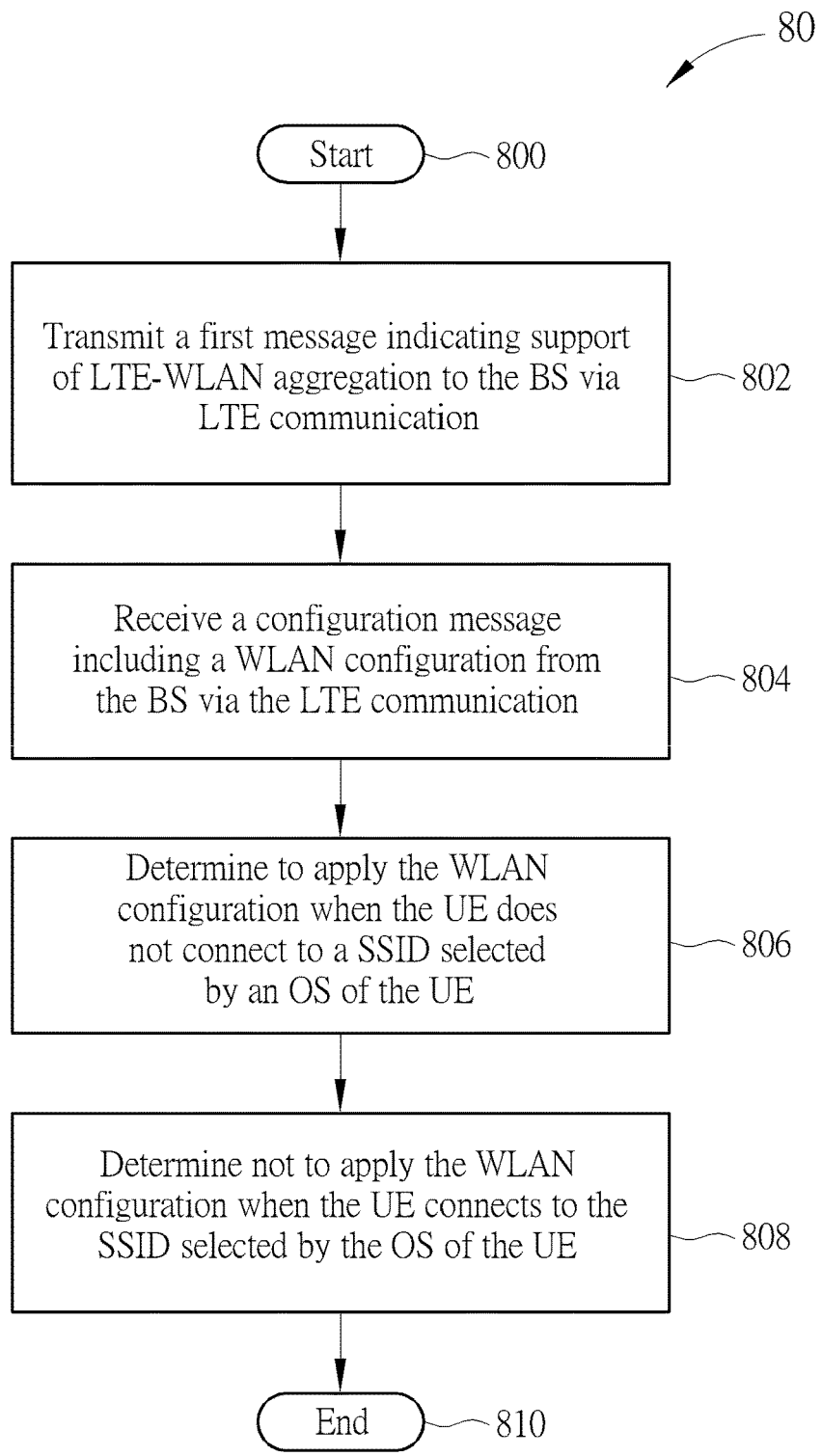
FIG. 8 is a flowchart of a process according to an example of the present invention.

FIG. 8 is a flowchart of a process 80 according to an example of the present invention. The process 80 may be utilized in a UE, to perform LTE-WLAN aggregation. The process 80 includes the following steps:

Step 800: Start.

Step 802: Transmit a first message indicating support of LTE-WLAN aggregation to the BS via LTE communication.

Step 804: Receive a configuration message including a WLAN configuration from the BS via the LTE communication.

Step 806: Determine to apply the WLAN configuration when the UE does not connect to a SSID selected by an OS of the UE.

Step 808: Determine not to apply the WLAN configuration when the UE connects to the SSID selected by the OS of the UE.

Step 810: End.

According to the process 80, the UE transmits a first message indicating support of LTE-WLAN aggregation to the BS (e.g., eNB) via LTE communication. The UE receives a configuration message (e.g., RRCConnectionReconfiguration) including a WLAN configuration from the BS via the LTE communication. Then, the UE determines to apply the WLAN configuration when the UE does not connect to a SSID selected by an OS of the UE, and the UE determines not to apply the WLAN configuration when the UE connects to the SSID selected by the OS.

Realization of the process 80 is not limited to the above description.

In one example, the UE transmits a second message notifying failure of applying the WLAN configuration or failure of connecting a WLAN in the WLAN configuration, to the BS via the LTE communication, when the UE determines not to apply the WLAN configuration. The second message may indicate that the UE is connected to a WLAN with the SSID selected by the OS or by the user.

Figure 9:
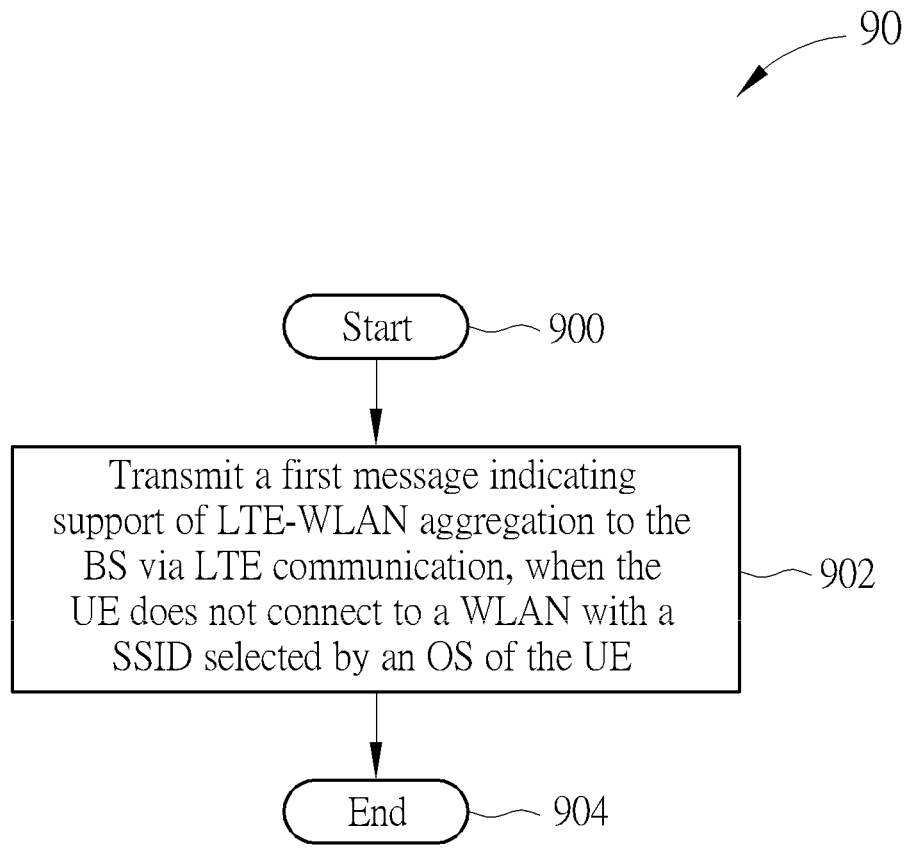
FIG. 9 is a flowchart of a process according to an example of the present invention.

FIG. 9 is a flowchart of a process 90 according to an example of the present invention. The process 90 may be utilized in a UE, to perform LTE-WLAN aggregation. The process 90 includes the following steps:

Step 900: Start.

Step 902: Transmit a first message indicating support of LTE-WLAN aggregation to the BS via LTE communication, when the UE does not connect to a WLAN with a SSID selected by an OS of the UE.

Step 904: End.

According to the process 90, the UE transmits a first message indicating support of LTE-WLAN aggregation to the BS (e.g., eNB) via LTE communication, when the UE does not connect to a WLAN with a SSID selected by an OS.

Realization of the process 90 is not limited to the above description.

In one example, the UE may transmit a second message indicating that the LTE-WLAN aggregation is not supported to the BS via the LTE communication, when the UE connects to the WLAN with a SSID selected by the OS.

Realization of any of the processes 40-90 is not limited to the above description.

In one example, the LTE packet above may be a Packet Data service data unit (SDU) or protocol data unit (PDU) of Convergence Protocol (PDCP), Radio Link Control (RLC) or Medium Access Control (MAC) in LTE. The LTE packet above may be replaced by a 5G packet which may be a 5G PDU or SDU in 5G layer 2 protocols. The 5G layer 2 protocols include at least one of 5G PDCP, 5G RLC and 5G MAC.

In one example, the UE connect to a WLAN with a SSID, a BSSID and/or a HESSID configured by the WLAN configuration, when the UE applies the WLAN configuration.

In one example, the UE may not show a WLAN icon on a display of the UE, when the UE connects to the WLAN configured by the WLAN configuration in the first configuration message and/or when the WLAN function is enabled by the WLAN configuration. The reason why not showing the WLAN icon is not to confuse the user.

In one example, the notification message is a RRC message including a measurement result indicating signal strength or quality of the WLAN is poor. In one example, the notification message is a PDCP control PDU or a MAC control element.

In one example, the OS of the UE may be an Android OS or iOS according to a selection of the user via an UI. In one example, the OS enables the WLAN function via an UI. In one example, the OS selects a SSID according to a priority made by the OS or a selection of a user via an UI when the WLAN function is enabled by the OS. In one example, the OS of the UE disables the WLAN function according to a selection of the user via the UI.

In one example, the UE receives the configuration message described above from the BS and transmit the message described above to the BS, via a RRC connection, when the UE has the RRC connection with the BS, i.e., the UE in a RRC connected mode.

In one example, the UE disables a first and/or a second items in an UI of the UE, when the LTE-WLAN aggregation is configured. The user uses the first item to enable/disable the WLAN function and the second item to select a SSID of the WLAN. Further, the UE enables the first item and/or enables the second item, when the LTE-WLAN aggregation is released by the BS or according to a condition, i.e., the UE is not configured to use the WLAN to receive or transmit the at least one first LTE packet. That is, the UE is prevented from changing the WLAN with a SSID, a BSSID and/or a HESSID configured by the BS to another WLAN selected by a user via the UI. The operation of the disabling means make the item grey or no function. In one example, the condition may be an event, e.g. a radio link failure occurred in the LTE communication.

In one example, the enabling may include turning on at least one WLAN (e.g., WiFi) chip such as a baseband IC/chip, a RF IC/chip and/or transceivers, or changing the at least one WLAN chip from a low power state to a normal power state or from a sleep mode to a normal operation mode. The low power state/sleep mode consumes lower power than the normal power state/normal operation mode. In contrast, the disabling may include turning off the at least one WLAN chip from the normal power state to the low power state or from the normal operation mode to the sleep mode.

In one example, an application side of the UE sends a first indication to a modem side of the UE, when the WLAN function of the UE is enabled by the OS running in the application side, wherein the first indication notifies that the WLAN function is enabled. Further, the application side of the UE sends a second indication to the modem side of the UE, when the WLAN function of the UE is disabled via the user interface, wherein the second indication notifies that the WLAN function is disabled.

It should be noted that the application side sends the indication directly or indirectly to the modem side. In one example of sending the indication indirectly, the application side sends the indication (e.g., "enabled") to a WLAN (e.g., WiFi) module or a baseband chip, then the WLAN module or the baseband chip sends another indication (e.g. "enabled") to the modem side.

Accordingly in the processes 40 and 50, the modem side of the UE determines to transmit the first message according to "disabled" status in the indication. The UE determines to transmit the second message or the notification message according to "enabled" status in the indication.

Accordingly in the processes 60 and 70, the modem side of the UE determines to transmit the first message according to "enabled" status in the indication. The UE determines to transmit the second message or the notification message according to "disabled" status in the indication.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and related communication device for handling the LTE-WLAN aggregation. Thus, the problem that whether/how to perform the LTE-WLAN aggregation is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of enabling long term evolution (LTE)-Wireless Local Area Network (WLAN) aggregation, comprising:
a storage device; and
a processing circuit, coupled to the storage device, wherein the storage device stores, and the processing circuit is configured to execute instructions of:
transmitting a first message indicating support of LTE-WLAN aggregation to a base station (BS) via LTE communication, when a WLAN function of the communication device is not enabled by an operating system of the communication device;
receiving a first configuration message configuring the LTE-WLAN aggregation from the BS via the LTE communication;
receiving at least one first LTE packet from the BS via the WLAN configured by a WLAN configuration in the first configuration message; and
transmitting a notification message indicating that a connection to the WLAN is lost or requesting the BS to release the WLAN configuration to the BS via the LTE communication, when the WLAN function of the communication device is enabled by the operating system of the communication device.

2. The communication device of claim 1, wherein the instructions further comprise:

receiving at least one second LTE packet from the BS via the LTE communication, wherein the at least one first LTE packet and the at least one second LTE packet belong to a same data radio bearer (DRB) or a same PDCP entity.

3. The communication device of claim 1, wherein the instructions further comprise:
stopping receiving the at least one first LTE packet from the BS via the WLAN configured by the WLAN configuration, when the WLAN function of the communication device is enabled.

4. The communication device of claim 1, wherein the instructions further comprise:
receiving a second configuration message releasing the LTE-WLAN aggregation or reconfiguring a DRB to which the at least one first LTE packet belong, from the BS via the LTE communication, wherein the second configuration message is transmitted in response to the notification message.

5. The communication device of claim 4, wherein the instructions further comprise:
transmitting a status report indicating which LTE packet is received or not to the BS via the LTE communication, when the WLAN function of the communication device is enabled by the operating system or in response to the first configuration message or the second configuration message.

6. The communication device of claim 1, wherein the instructions further comprise:
an application side of the communication device sends a first indication to a modem side of the communication device, when the WLAN function of the communication device is enabled by the operating system running in the application side, wherein the first indication notifies that the WLAN function is enabled; and
the application side of the communication device sends a second indication to the modem side of the communication device, when the WLAN function of the communication device is disabled by the operating system, wherein the second indication notifies that the WLAN function is disabled.

7. The communication device of claim 1, wherein the instructions further comprise:
disabling a first item in the user interface used to enable/disable the WLAN function and/or a second item in the user interface used to select a service set identifier (SSID) of the WLAN, when the LTE-WLAN aggregation is configured; and
enabling the first item in the user interface and/or the second item in the user interface, when the LTE-WLAN aggregation is released by the BS or according to a condition.

8. The communication device of claim 1, wherein the instructions further comprise:
enabling the WLAN function of the communication device, when the communication device receives the WLAN configuration or a WLAN measurement configuration.

9. A communication device of enabling long term evolution (LTE)-Wireless Local Area Network (WLAN) aggregation, comprising:
a storage device; and
a processing circuit, coupled to the storage device, wherein the storage device stores, and the processing circuit is configured to execute instructions of:
transmitting a first message indicating support of LTE-WLAN aggregation to a base station (BS) via LTE communication, when a WLAN function of the communication device is enabled by an operating system of the communication device; and
transmitting a second message indicating that the LTE-WLAN aggregation is not supported to the B S via the LTE communication, when the WLAN function of the communication device is disabled by the operating system of the communication device.

10. The communication device of claim 9, wherein the instructions further comprise:
receiving a first configuration message configuring the LTE-WLAN aggregation from the B S via the LTE communication, after transmitting the first message;
connecting to a WLAN according to a WLAN configuration in the first configuration message; and
receiving the at least one LTE packet from the BS via the WLAN.

11. The communication device of claim 10, wherein the instructions further comprise:
not showing a WLAN icon on a display of the communication device when connecting to a WLAN configured by a WLAN configuration in the first configuration message.

12. The communication device of claim 9, wherein the communication device transmits the first message indicating the support of the LTE-WLAN aggregation to the BS, when the WLAN function of the communication device is enabled by the operating system and the communication device does not connect to the WLAN.

13. The communication device of claim 9, wherein the instructions further comprise:
not transmitting the first message indicating the support of the LTE-WLAN aggregation to the B S, when the WLAN function of the communication device is disabled by the operating system.

14. A communication device of enabling long term evolution (LTE)-Wireless Local Area Network (WLAN) aggregation, comprising:
a storage device; and
a processing circuit, coupled to the storage device, wherein the storage device stores, and the processing circuit is configured to execute instructions of:
transmitting a first message indicating support of LTE-WLAN aggregation to a base station (BS) via LTE communication, when a WLAN function of the communication device is enabled by an operating system of the communication device;
receiving a first configuration message configuring the LTE-WLAN aggregation from the BS via the LTE;
receiving at least one first LTE packet from the BS via a WLAN configured by a WLAN configuration in the first configuration message; and
transmitting a notification message indicating that a connection to the WLAN is lost or requesting the BS to release the WLAN configuration to the BS via the LTE communication, when the WLAN function of the communication device is disabled by the operating system of the communication device.

15. The communication device of claim 14, wherein the instructions further comprise:
receiving at least one second LTE packet from the BS via the LTE communication when the communication device is configured the LTE-WLAN aggregation, wherein the at least one first LTE packet and the at least one second LTE packet belong to a same data radio bearer (DRB) or a same PDCP entity.

16. The communication device of claim 14:
    stopping receiving the at least one first LTE packet from the BS via the WLAN configured by the WLAN configuration, when the WLAN function of the communication device is disabled by the operating system.

17. The communication device of claim 14, wherein the instructions further comprise:
    receiving a second configuration message releasing the WLAN configuration or reconfiguring a data radio bearer (DRB) to which the at least one first LTE packet belong, from the BS via the LTE communication, wherein the second configuration message is transmitted in response to the notification message.

18. The communication device of claim 14, wherein the instructions further comprise:
    transmitting a status report indicating which LTE packet is received or not, to the BS via the LTE communication, when the WLAN function of the communication device is disabled by the operating system.

19. The communication device of claim 14, wherein the instructions further comprise:
    an application side of the communication device sends a first indication to a modem side of the communication device, when the WLAN function of the communication device is enabled by the operating system, wherein the first indication notifies that the WLAN function is enabled; and
    the application side of the communication device sends a second indication to the modem side of the communication device, when the WLAN function of the communication device is disabled by the operating system, wherein the second indication notifies that the WLAN function is disabled.

20. The communication device of claim 14, wherein the instructions further comprise:
    receiving a status report indicating which LTE packet is received or not by the BS, wherein the status report is transmitted from the BS via the LTE communication in response to the notification message.

* * * * *